United States Patent [19]
Dabi et al.

[11] Patent Number: 5,910,520
[45] Date of Patent: Jun. 8, 1999

[54] MELT PROCESSABLE BIODEGRADABLE COMPOSITIONS AND ARTICLES MADE THEREFROM

[75] Inventors: Shmuel Dabi, Highland Park; Ram L. Kataria, Hamilton Square, both of N.J.

[73] Assignee: McNeil-PPC, Inc., Skillman, N.J.

[21] Appl. No.: 08/006,013

[22] Filed: Jan. 15, 1993

[51] Int. Cl.$^6$ .............. C08L 3/02; C08L 67/04; C08L 67/02; C08K 5/103
[52] U.S. Cl. .............. 523/128; 524/47; 524/211; 524/306; 524/312; 524/386; 524/387; 524/425
[58] Field of Search .............. 524/47, 292, 312, 524/425, 539, 427; 525/437, 448, 450, 411, 413, 415, 190; 523/128

[56] References Cited

U.S. PATENT DOCUMENTS

| | | | |
|---|---|---|---|
| 4,393,167 | 7/1983 | Holmes et al. | 525/415 |
| 4,673,438 | 6/1987 | Wittwer et al. | 106/126 |
| 5,035,930 | 7/1991 | Lacourse et al. | 428/35.6 |
| 5,124,371 | 6/1992 | Tokiwa et al. | 525/415 |
| 5,169,889 | 12/1992 | Kauffman et al. | 524/271 |
| 5,206,087 | 4/1993 | Tokiwa et al. | 428/403 |
| 5,217,803 | 6/1993 | McBride et al. | 428/323 |
| 5,225,490 | 7/1993 | Tokiwa et al. | 525/411 |
| 5,234,977 | 8/1993 | Bastioli et al. | 524/47 |
| 5,278,202 | 1/1994 | Dunn et al. | 525/411 |

FOREIGN PATENT DOCUMENTS

| | | | |
|---|---|---|---|
| 0057415 | 8/1982 | European Pat. Off. | 525/411 |
| 0 304 401 A2 | 2/1989 | European Pat. Off. | |
| 0 326 517 A1 | 6/1989 | European Pat. Off. | |
| 0 327 505 A2 | 8/1989 | European Pat. Off. | |
| 0 400 531 A1 | 12/1990 | European Pat. Off. | |
| 0 400 532 A1 | 12/1990 | European Pat. Off. | |
| 0 404 723 A2 | 12/1990 | European Pat. Off. | |
| 0 404 727 A2 | 12/1990 | European Pat. Off. | |
| 0 404 728 A3 | 12/1990 | European Pat. Off. | |
| 0 408 502 A2 | 1/1991 | European Pat. Off. | |
| 0 409 788 A2 | 1/1991 | European Pat. Off. | |
| 3238232 | 4/1984 | Germany | 524/47 |
| 4653 | 7/1988 | Japan . | |
| 205114 | 2/1987 | New Zealand . | |
| WO 90/10671 | 9/1990 | WIPO . | |
| WO 91/02023 | 2/1991 | WIPO . | |
| WO 91/02024 | 2/1991 | WIPO . | |
| 9201733 | 2/1992 | WIPO | 523/124 |
| WO 92/01743 | 2/1992 | WIPO . | |
| WO 92/14782 | 9/1992 | WIPO . | |
| WO 92/19680 | 11/1992 | WIPO . | |

OTHER PUBLICATIONS

Poly–D(–)(3–hydroxybutytrate)/poly(ethylene oxide) blends: phase diagram, thermal and crystallization behaviour, M. Avella et al., Polymer, 1988, vol. 29. Oct. pp. 1731–1737.

Survey of Polymer Blends Containing Poly(3–hydroxybutyrate–co–16% Hydroxyvalerate), P.B. Dave et al. Dept. of Plastics Engineering & Chem., Univ. of Lowell, pp. 442–443.

Biodegradation of Blends Containing Poly(3–Hydroxybutyrate–co–valerate), P. Dave, et al., Dept. of Plastics Engineering & Chem., Univ. of Lowell, pp.231–234.

Enzymatic degradation and morphologies of binary blends of microbial poly(3–hydroxybutyrate) with poly (ε–caprolactone), poly (1,4–butylene adipate and poly(vinyl acetate) Y. Kumagai et al., Polymer Degradation & Stability, 36 (1992) pp. 241–248.

Enzymatic Degradation of Poly(3–hydroxybutyrate)–based blends: poly (3–hydroxybutyrate)/poly(ethylene oxide) blend, Y. Kumagai et al., Polymer. Degradation & Stability, 35 (1992) pp. 87–93.

Degradation Kinetics of Polymer Films in Marine & Soil Systems under Accel. Conditions, J. Mayer et al., US Army Natick Res. Develop. & Eng. Cntr., & R. Gross et al. Univ. of Lowell, Lowell, MA 858–61.

Starch–Based Blown Films, F. Otey, et al. Ind. Eng. Chem. Res. 1987, 26, pp. 1659–1663.

Degradation Ranking of Plastics in a Landfill Environment, G.P. Smith et al. Dept. of Chem. Biol. & Plast. Eng. & D. Kaplan, US Army Natick Res. Cntr. Natick, MA pp. 867–871.

*Primary Examiner*—Peter Szekely
*Attorney, Agent, or Firm*—Joel A. Rothfus

[57] ABSTRACT

The invention presents classes of thermoplastic, biodegradable compositions. Tests indicate that these compositions exhibit good mechanical properties, and readily degrade in the presence of microorganisms. The compositions of this invention are useful for producing injection-molded, thin-walled articles that are capable of appreciably degrading in the sewage system within thirty (30) days.

14 Claims, 2 Drawing Sheets

MELT PROCESSABLE BIODEGRADABLE COMPOSITIONS AND ARTICLES MADE THEREFROM

BACKGROUND OF THE INVENTION

This invention is related to the development and use of environmentally friendly materials that can alleviate the growing environmental problem of excessive trash. This invention relates to the development of compositions that degrade rapidly by microorganisms. These compositions can be used in a variety of consumer disposable products. For example, the materials can be fabricated into films, fibers and molded parts for the manufacturing of disposable products such as diapers, sanitary napkins, adult incontinence products, and particularly tampon applicators.

Many natural polymers are known to degrade rapidly by microorganisms but most of them are not useful in fabricating articles because they lack the properties typical to plastic materials. In addition, they are not melt processable. One such material is natural starch. Being cheap and readily available, starch has become the leading component in many developments of biodegradable compositions. The challenge has always been to convert this heat sensitive powder into a melt processable composition that has good mechanical properties while maintaining its high rate of biodegradation.

Many natural and synthetic materials are also known to undergo a rapid digestion by microorganisms. Their chemical structures vary from hydrocarbons and carbohydrates to molecules with ester or amide linkages. Encyclopedia of Chemical Technology, *Plastic, Environmentally Degradable*, Supp. Vol., 626–68 (Kirk-Othmer, 3d ed.). Most of these materials are not useful in fabricating articles because they lack the mechanical properties typical to plastic materials, in addition to being difficult to process.

The use of starch as a low cost biodegradable filler in certain polymeric systems is known. A fairly high concentration of starch filler is required to achieve biodegradation. At the same time, the mechanical properties of the compositions deteriorate sharply with increasing starch content. The first breakthrough in making high starch content materials was the discovery that starch can be melt processed in the presence of water, heat, and pressure. See U.S. Pat. Nos. 4,133,784 and 4,337,181 ("the USDA patents").

The USDA patents describe the use of starch filled poly(ethylene-acrylic acid) (EAA) and polyethylene (PE) as a biodegradable film for packaging and agricultural mulch. These patents describe a process where the starch is first gelatinized in the presence of water at elevated temperatures. Under such conditions the highly hydrogen bonded natural structure is destroyed and melt flow is attained. The resulting mixture is then blended with EAA and PE. Large amounts of water are used (20%–50%) and the final starch content is as high as 60 wt. %, after the water is removed.

Tests have indicated that the biodegradation rate of the materials prepared according to these patents displayed unsatisfactory biodegradation properties. The injected molded parts containing PE/EAA with 40 wt. % starch did not degrade at all in the sewage system (0 to 5% weight loss) after 30 days. This time period was selected for testing because water treatment facilities typically had sewage in residence for about 30 days, but in modern facilities the in residence time is less than a week. However, sanitary protection devices may end up in septic tanks as well so to avoid accumulation and clogging in the plumbing it is reasonable to require a maximum 30 days for degradation.

A starch based blown film is also described in an article by Felix Otey. *Ind. Eng. Chem. Res.*, 1987, 26, 1659–1663.

U.S. Pat. No. 3,949,145 describes a method to prepare polyvinyl alcohol films filled with starch for agricultural applications. This composition is highly water sensitive, making the composition highly unsuitable for disposable products such as diapers and sanitary napkins. Also, polyvinyl alcohol-containing samples degrade very slowly under simulated anaerobic sewage treatment conditions making compositions formulated according to this patent unsuitable for disposable products.

Injection molded starch capsules are described in U.S. Pat. No. 6,673,438. These capsules are made from pure starch in the presence of 5% to 30% water and heat. The structure of the strongly hydrogen bonded starch is believed to be destroyed under these conditions, creating a melt flow. The resulting material is stiff and extremely water sensitive, which make the compositions a poor candidate for biodegradable products such as disposable diapers and sanitary napkins.

Recent improvements in producing starch based biodegradable articles have been reported. See U.S. Pat. No. 4,673,438; U.K. Patent Number 2,190,093; and European Publications 282,451, 298,920, 304,401, 326,517, and 327,505.

U.S. Pat. No. 5,095,054 discloses polymer blends that can be transformed by heat and under pressure to form products having dimensional stability. These compositions comprise destructurized starch, and at least one substantially water insoluble polymer; the composition may optionally contain another water-insoluble polymer and a plasticizer. The starch used in these compositions has a relatively high water content that significantly modifies the starch's dimensional and mechanical properties; although the destructurized starch is thermoplastic, it is not water resistant. This starch composition is an unsuitable substrate for manufacturing disposable products such as tampon applicators, disposable diapers, and sanitary napkins.

U.S. Pat. No. 5,087,650 discloses biodegradable plastic compositions comprising unmodified starch and thermoplastic polymers. The starch too has a high water content that causes the starch to become destructurized when heated under pressure. This affects the starch's dimensional and mechanical properties and makes the compositions unsuitable for biodegradable thermoplastic compositions.

GB 2,190,093 describes starch compositions that consist of at least 72 wt. % starch and, optionally, a second hydrophilic polymer. The presence of at least 10 wt. % water is also essential in that process which makes the compositions unsuitable for consumer products.

PCT Application, International Publication Number WO91/02025, discloses a starch-polymer alloy comprising destructurized starch and an ethylene copolymer. Tests have indicated that compositions prepared according to this patent lacked the necessary biodegradation properties required to be suitable for consumer products.

The use of poly(3-hydroxybutyrate) (PHB) and poly (3-hydroxyvalerate) (PHV) copolymer blends are described in Dave. et al., *Polym. Mater. Sci.*, 1990, 62, 231–35. Degradation studies of polycaprolactone/PHBV compositions yielded relatively low weight loss under lab enzymatic hydrolysis.

A molded tampon applicator from poly(3-hydroxybutyrate) and poly (3-hydroxyvalerate), a plasticizer, and a nucleating agent is described in U.S. Pat. No. 4,900,299, assigned to McNeil. Also disclosed is the optional use of a biodegradable filler as hydroxyalkyl cellulose or starch.

The use of starch filled polymers is the cheapest and most convenient route for producing functional biodegradable materials. But the starch content in such compositions must be very high (>50 wt. %) to achieve a reasonable rate of biodegradation. Further, starch powder typically contains 10% to 40% by weight moisture. This starch is generally charged into an extruder where the combination of heat and pressure is sufficient to destructurize and melt the starch. Because starch becomes the major phase, the resulting materials are brittle and require further modifications.

Typically, a fairly high concentration of starch filler is required to achieve biodegradation. But conventional polymers such as polyethylene, polyurethane, etc. have a limited useful capacity for starch filler, that is, the mechanical properties of the compositions deteriorate sharply with increasing starch content. Further, microorganisms have been shown to selectively digest the starch without degrading the polymeric matrix.

The prior art discloses certain compositions that contain destructurized starch, which is a water soluble material and has a very limited use in consumer products. This starch is formed by exposing starch to heat and pressure in the presence of water, which breaks the hydrogen bonds between the starch molecules and renders the materials thermoplastic but soluble in cold water, and thus, unsuitable for consumer products. For this reason, other water insoluble polymers have been incorporated into such compositions, but this caused poor biodegradation.

Despite advances, there still remained a challenge to find a reasonable trade-off between water resistance and high rate of degradation. The present invention provides compositions that maintain a proper balance between mechanical properties, high biodegradation rate, processability, and low cost.

SUMMARY OF THE INVENTION

Tests indicate that compositions of the present invention are thermoplastic, exhibit good mechanical properties, and readily degrade in the presence of microorganisms. The compositions of this invention can be injection molded into thin walled parts which are capable of appreciably degrading in the sewage system in thirty days. These products find utility in flushable disposable products.

These compositions comprise a. about 15 to 50 wt. % of a starch-polymer alloy, the starch-polymer alloy comprising:
   i. about 50 to 80 wt. % destructurized starch and about 20 to 50 wt. % of a hydrophobic copolymer selected from the group consisting of ethylene-vinyl acetate having a vinyl acetate molar content of from about 5 to 90%, modified ethylene vinyl-acetate having from about 5 to 90% of hydrolyzed acetate groups, ethylene-glycidil acrylate, ethylene-methyl methacrylate, ethylene-maleic anhydride, and mixtures thereof;
   ii. a plasticizer having a boiling point greater than 150° C. selected from the group consisting of glycerine; polyethylene glycol; ethylene glycol; propylene glycol; sorbitol; mannitol; the acetate, ethoxylated and propoxylated derivatives of glycerine, polyethylene glycol, ethylene glycol, propylene glycol, sorbitol, mannitol; and mixtures thereof;
   iii. 0 up to about 20 wt. % urea with respect to the weight of the destructurized starch component in (i); and
b. about 30 to 55 wt. % of unmodified starch; and
c. a water soluble plasticizer containing hydroxyl groups and having a molecular weight of less than about 1000.

This invention further relates to articles prepared from the biodegradable compositions disclosed herein, in particular, disposable tampon applicators.

DETAILED DESCRIPTION OF THE INVENTION

Figure 1:
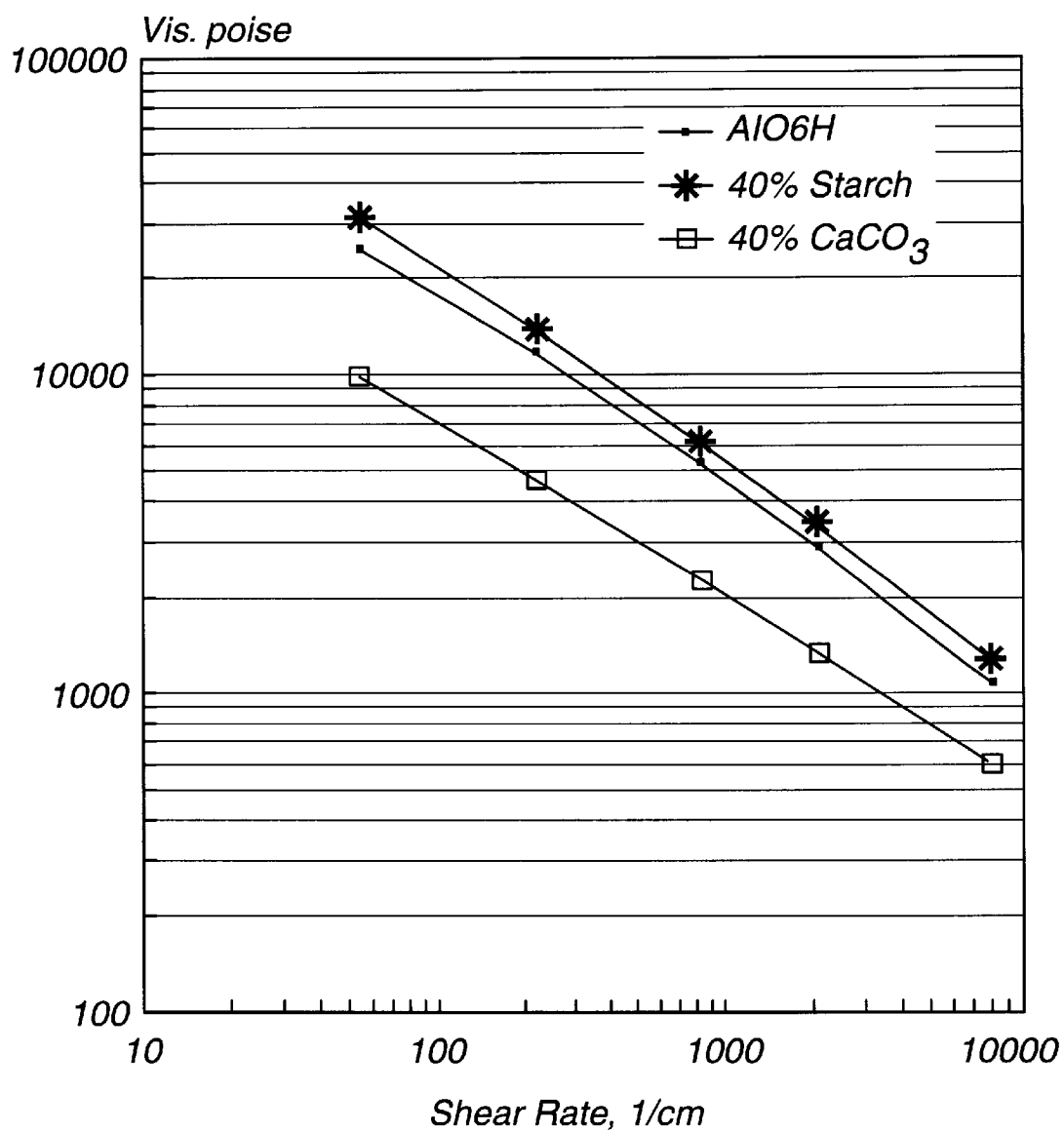
FIG. 1 is a graphical representation illustrating that modifying the pre-made starch-polymer alloy (AI06H resin) with 20 wt. % glycerin and 40 wt. % starch resulted in a higher viscosity, whereas with 40 wt. % $CaCO_3$ a significant lower viscosity was achieved.

This invention provides a class of thermoplastic biodegradable compositions.

This invention relates to degradable thermoplastic compositions comprising a premade starch-hydrophobic polymer alloy, blended with unmodified starch and a liquid plasticizer.

The starch-polymer alloy comprises about 50 to 80 wt. % destructurized starch and 20 to 50 wt. % of a water insoluble polymer. In the context of this invention, "destructurized starch" has its conventional meaning, i.e., starch that has been formed by thermoplastic melt formation in the presence of water; this process disrupts the starch's hydrogen bonds, and, thus, the starch's crystalline structure. The water insoluble polymer is selected from the group consisting of ethylene-vinyl acetate having a vinyl acetate molar content of from about 5 to 90%, modified ethylene vinyl-acetate having from about 5 to 90% of hydrolyzed acetate groups, ethylene-glycidil acrylate, ethylene-methyl methacrylate, ethylene-maleic anhydride, and mixtures thereof. In certain preferred embodiments, the polymer will be ethylene-vinyl acetate, preferably with a vinyl acetate content of about 12 to 80%.

The starch-polymer alloy further comprises a plasticizer selected from the group consisting of glycerine; polyethylene glycol; ethylene glycol; propylene glycol; sorbitol; mannitol; the acetate, ethoxylated and propoxylated derivatives of glycerine, polyethylene glycol, ethylene glycol, propylene glycol, sorbitol, mannitol; and mixtures thereof. In certain preferred embodiments, the plasticizer will be glycerine. Generally, the plasticizer comprises between about 20 to 60 wt. % of the destructurized starch component present in the alloy.

The alloy further comprises 0 up to about 20 wt. % urea with respect to the weight of the destructurized starch component; that is, if the composition contains 60 grams of destructurized starch the composition will contain 12 grams of urea.

The content of the above-described premade starch-polymer alloy in the biodegradable composition is about 15 to 50 wt. %, preferably about 15 to 30 wt. %.

This starch-polymer alloy is further blended with unmodified starch having a low water content. In the context of this invention, "unmodified starch" means starch that has not been melt processed, and, thus, its crystalline structure has not been disrupted. In certain preferred embodiments, the starch content has no more than about 2 wt. % water. In a more preferred embodiment, the starch has no more than about 0.1 wt. % water. In a preferred embodiment, the particle size of the starch will be less than about 15 microns, preferably about 5 to 10 microns, and more preferably less than about 5 microns.

The unmodified starch content of the biodegradable composition is about 30 to 55 wt. %, preferably about 40 to 50 wt. %. In a preferred embodiment, the total starch content of the biodegradable composition (i.e., the destructurized plus the unmodified starch) will be about 55 to 70 wt. %, more preferably about 60 to 65 wt. %.

To arrive at the composition of the invention the starch-polymer alloy is further blended with a water soluble plasticizer containing hydroxyl groups. This plasticizer should have a molecular weight of less than about 1000. In certain preferred embodiments, the plasticizer may be glycerin, trimethylpropane, sorbitol, erythritol, or polyethylene glycol. In a more preferred embodiment, the plasticizer is glycerin. Other suitable plasticizers will be apparent to those skilled in the art, and the use of other plasticizers will not depart from the spirit of the invention. The amount of the plasticizer utilized is an amount effective to render the composition thermoplastic and to reduce the composition's sensitivity to water. Generally, the plasticizer is present in an amount about 15 to 30 wt. % of the composition, preferably 20 to 30 wt. %.

In addition to unmodified starch other inert additives, such as calcium carbonate ($CaCO_3$) can be incorporated into the formulation. In certain preferred embodiments, the amount of additional inert filler is about 2 to 20 wt. %, more preferably about 5 to 10 wt. %.

The following table summarizes the preferred utilization ranges:

TABLE 1

| MATERIAL | RANGE, WEIGHT % | PREFERRED RANGE, % |
| --- | --- | --- |
| Total pre-made alloy | 15–50 | 15–30 |
| Unmodified starch | 30–55 | 40–50 |
| Plasticizer | 15–30 | 20–30 |
| $CaCO_3$ | 2–20 | 5–10 |
| Calculated Values: | | |
| Modified starch | 9–30 | 9–18 |
| Hydrophobic water insoluble compatible polymer | 6–20 | 6–12 |
| Total Starch | 55–70 | 60–65 |

The thermoplastic compositions of this invention are useful for producing injection-molded, thin-walled articles which have the advantage of being biodegradable. Thus, the compositions are particularly useful for preparing flushable, disposable products such as tampon applicators. Shaped articles such as films, fibers, and molded parts can be made from the claimed compositions not only by injection molding processes but also by melt-processes such as melt-extrusion, and compression molding.

EXAMPLE a. Preparation

Materials

AI06H—Mater Bi® molding grade, a starch-polymer alloy (Novamont).

Starch—Clinton 400 corn starch, 1 wt. % moisture (ADM, Decture Ill.).

$CaCO_3$—Calcium Carbonate—Supermite, 1 micron particle size, untreated (ECC International, Syalacauga, Ala.).

Glycerin—99% pure.

PEG—Carbowax, 600 MW (Union Carbide).

Atmer 129—glycerol monostearate mold release agent (ICI).

Injection molding grade Mater-Bi® (AI06H) was obtained from Novamont in 50 kg sealed bags. The pellets were mechanically mixed with the modifying powders (starch, calcium carbonate) and liquids (polyethylene glycol, Carbowax, glycerin) and fed into a twin screw Brabender mixer. The barrel temperature was kept at 160° C. to avoid thermal degradation of starch. Screw speed was 50 RPM and the total throughput reached 15–20 1 b/hr. The strands were air cooled on a conveyor prior to entering the pelletizer. The melt rheology of each composition was determined at various shear rates using a capillary rheometer from Keyaness (Honey Brook Pa., model Galaxy IV #0052). Films were made by compression molding the pellets into 10–20 mil thick films (5000 psi, 160° C. in a Pasadena Press) for characterization and biodegradation testing. Selected compositions were injection molded into a tampon applicator using an Engle 80 ton machine with 5.2 ounce barrel extruder.

b. Biodegradation Tests

Bench scale digestion units were set up in one incubator. Each unit contained a mixture of freshly collected digested and raw sludges from a waste treatment facility. Previous acclimated sludge (seed) was also added at about 1.5% level. The anaerobic digesters were placed in an incubator at 35° C. Each test material (1 gram film, 10–20 mil thick) was wrapped in a nylon mesh containing glass weight to assure contact with bottom of the sludge. Weight loss and gas evolution was monitored for 30 days.

Glycerin and starch are highly compatible with Mater-Bi resin and their blends produced clear films. In the biodegradation tests, it appeared that the synthetic polymer portion of the Mater-Bi® did not degrade and this preserved the film integrity. The addition of glycerin and starch reduced the synthetic resin content in the composition and increased the degradation rate. In the unmodified starch alloys, around 55% weight loss was measured, which is also the nominal concentration of starch in Mater-Bi®. The modified resins, have shown weight losses of up to 88%.

An empirical correlation can be drawn between the rate of degradation and the hydrophobic resin content in the continuous phase. The modified compositions' concentration in the continuous phase can be calculated as follows:

$$\% \text{ Synthetic resin} = \frac{[\text{Mater-Bi\textregistered\ concentration}] \times 0.4}{[\text{Mater-Bi\textregistered\ concentration}] + [\text{Starch added}]}$$

In Table 3, the calculated portion of the synthetic resin and the corresponding weight losses are shown.

TABLE 3

| Biodegradation of Mater-Bi ® (AIO6H) Formulations | | | | | | | |
| --- | --- | --- | --- | --- | --- | --- | --- |
| Example # | A | B | C | D | E | F | G |
| AIO6H | 40 | 45 | 50 | 40 | 45 | 45 | 100 |
| Glycerin | 20 | 20 | 20 | 20 | 20 | 20 | — |
| Starch | 40 | 35 | 30 | 20 | 15 | — | — |
| $CaCO_3$ | — | — | — | 20 | 20 | 35 | — |
| Synthetic resin, %-calculated | 20 | 22.5 | 25 | 27 | 30 | 40 | 40 |
| 30 days weight loss, % | 88 | 80.4 | 76.6 | 70.1 | 68.5 | 54 | 55 |

The results also indicate that the presence of $CaCO_3$ has no effect on the biodegradation. In comparing samples F and G with samples A–E, it is evident that to achieve a higher rate of degradation, the continuous phase may be diluted with starch.

c. Melt Flow Characteristics

The starch compositions must meet certain melt flow requirements for producing injection molded parts with thin walls, such as a tampon applicator. The rheology measurements also suggest that the starch has a strong interaction with Mater-Bi®. This was manifested in a very sharp increase in the melt viscosity. Such phenomenon was not observed with inert fillers, i.e., calcium carbonate.

Figure 2:
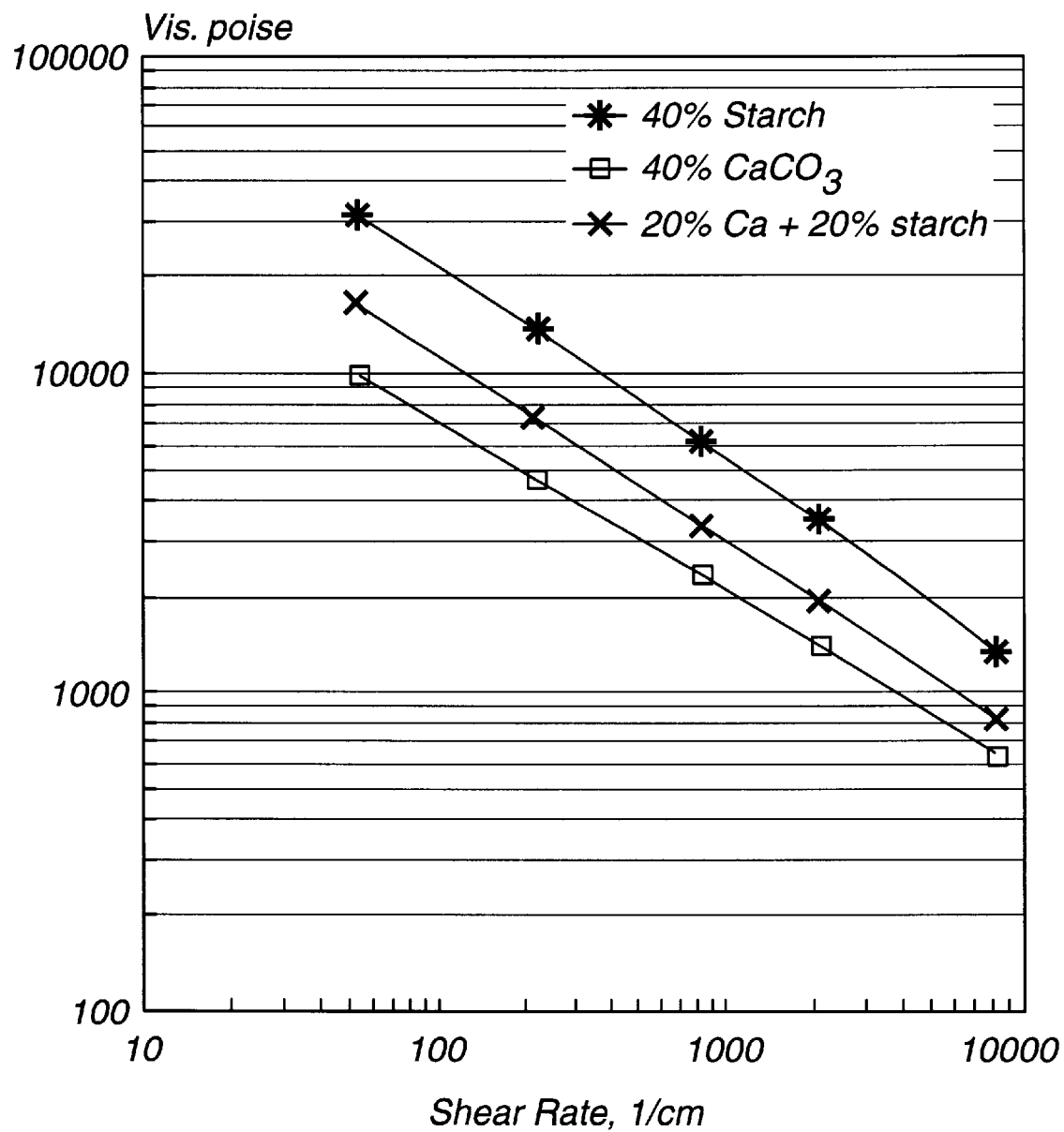
FIG. 2 is a graphical representation demonstrating the simplicity of viscosity control by varying the starch and $CaCO_3$ content.

As expected, the addition of glycerin caused a significant reduction in the melt viscosity. At the same time, glycerin rendered the composition soft and pliable. Although this had facilitated the mold filling process, it also necessitated a very long cooling period to prevent distortion of the part upon ejection. It was found that the softening effect of glycerin can be offset by the addition of starch powder but not calcium carbonate. Hence, for a given amount of glycerin and added powder, both the stiffness and the melt viscosity can be determined by the ratio of starch to $CaCO_3$. This effect is illustrated in the attached figures. FIG. 1 shows that modifying the AI06H resin with 20 wt. % glycerin and 40 wt. % starch resulted in a higher viscosity, whereas with 40 wt. % $CaCO_3$ a significant lower viscosity was achieved. FIG. 2 demonstrates the simplicity of viscosity control by varying the starch and $CaCO_3$ content. The various formulations and their measured properties are listed in Table 4.

TABLE 4

| Exam. # | AIO6H | GLYCERIN | STARCH | $CaCO_3$ | ATMER-129 | VISCOSITY 1000/sec | Degradation, % loss, 30 days |
|---|---|---|---|---|---|---|---|
| Mater-Bi ® (AIO6H unmodified alloy) | | | | | | 4854 | 55.1 |
| A1 | 50 | 20 | 30 | | | 3511 | 76.6 |
| A2 | 45 | 20 | | 35 | | 2210 | 53.9 |
| A3 | 45 | 20 | 35 | | | 5409 | 80.4 |
| A4 | 45 | 20 | 15 | 20 | | 2524 | 68.5 |
| A5 | 40 | 20 | 40 | | | 5639 | 88.1 |
| A6 | 40 | 20 | 20 | 20 | | 3009 | 70.1 |
| A7 | 45 | 20 | 30 | 5 | | 3479 | |
| A8 | 45 | 20 | 25 | 10 | | 3213 | |
| A9 | 45 | 15 | 35 | 5 | 0.4 | 6360 | |
| A10 | 40 | 15 | 30 | 15 | 0.4 | 6187 | |
| A11 | 45 | 15 | 30 | 10 | 0.4 | 6442 | |
| A12 | 45 | 15 | 25 | 15 | 0.4 | 5748 | |
| A13 | 40 | 15 | 25 | 20 | 0.4 | 5517 | |
| A14 | 40 | 15 | 20 | 25 | 0.4 | 4736 | |
| A15 | 40 | 17 | 20 | 23 | 0.4 | 4080 | |
| A16 | 38 | 17 | 25 | 20 | 0.4 | 4763 | |
| A17 | 35 | 20 | 40 | 5 | 0.4 | 4827 | |
| A18 | 35 | 20 | 35 | 10 | 0.4 | 5115 | |
| A19 | 35 | 23 | 42 | | 0.4 | 4810 | 84.6 |
| A20 | 30 | 25 | 45 | | 0.4 | 4059 | |
| A21 | 35 | 23 | 40 | 2 | 0.8 | 4222 | |
| A22 | 35 | 23 | 40 | 2 | 1.2 | 3843 | |
| A23 | 35 | 23 | 40 | 2 | 1.6 | 3523 | |
| A24 | 30 | 25 | 45 | | 1.0 | 4124 | |
| A25 | 25 | 25 | 50 | | 1.0 | 4903 | |
| A26 | 22 | 28 | 50 | | 1.0 | 4100 | |

A critical balance was identified between the components that would enable a short cycle molding. A desired viscosity range of 3300–4200 poise at 100 $sec^{-1}$ shear rate and 160° C. was identified. Incomplete parts were produced with higher viscosities and soft distorted parts were obtained at the lower end. The addition of the flow modifier, Atmer 129 from ICI proved beneficial since it can reduce the viscosity without decreasing the modulus (i.e., stiffness) of the alloy. The effect of Atmer on viscosity can be seen in Table 4, experiments A21, A23, and A23.

What is claimed:

1. A composition of matter comprising
   a. about 15 to 50 wt. % of a starch-polymer alloy, the starch-polymer alloy comprising:
      i. about 50 to 80 wt. % destructurized starch and about 20 to 50 wt. % of a hydrophobic copolymer selected from the group consisting of ethylene-vinyl acetate having a vinyl acetate molar content of from about 5 to 90%, modified ethylene vinyl-acetate having from about 5 to 90% of hydrolyzed acetate groups, ethylene-glycidil acrylate, ethylene-methyl methacrylate, ethylene-maleic anhydride, and mixtures thereof;
      ii. a plasticizer present in an amount of about 20 to 60 wt. % of the destructurized starch component of (i) present in the starch-polymer alloy, said plasticizer is selected from the group consisting of glycerine; polyethylene glycol; ethylene glycol; propylene glycol; sorbitol; mannitol; the acetate, ethoxylated and propoxylated derivatives of glycerine, polyethylene glycol, ethylene glycol, propylene glycol, sorbitol, mannitol; and mixtures thereof; and
      iii. 0 up to about 20% urea with respect to the weight of the destructurized starch component of (i); and
   b. about 15 to 55 wt. % of unmodified starch; and
   c. a water soluble plasticizer containing hydroxyl groups and having a molecular weight of less than about 1000.

2. The composition of claim 1 which further comprises about 2 to 20 wt. % of an inert filler.

3. The composition of claim 2 wherein the inert filler is calcium carbonate.

4. The composition of claim 3 wherein calcium carbonate comprises about 5 to 10 wt. % of the composition.

5. The composition of claim 1 which comprises about 15 to 30 wt. % of component a.

6. The composition of claim 1 wherein the unmodified starch, component b, contains no more than about 2 wt. % water.

7. The composition of claim 1 which comprises about 30 to 55 wt. % of the unmodified starch, component b.

8. The composition of claim 1 which comprises about 40 to 50 wt. % of the unmodified starch, component b.

9. The composition of claim 1 wherein the starch content of the total composition is in the range of about 55 to 70 wt. %.

10. The composition of claim 1 wherein the starch content of the total composition is in the range of about 60 to 65 wt. %.

11. A method of preparing a biodegradable composition comprising:

a. blending about 50 to 80 wt. % of destructurized starch with a hydrophobic copolymer selected from the group consisting of ethylene-vinyl acetate having a vinyl acetate molar content of from about 5 to 90%, modified ethylene vinyl-acetate having from about 5 to 90% of hydrolyzed acetate groups, ethylene-glycidil acrylate, ethylene-methyl methacrylate, ethylene-maleic anhydride, and mixtures thereof;

b. blending the product of step (a) with a plasticizer selected from the group consisting of glycerine; polyethylene glycol; ethylene glycol; propylene glycol; sorbitol; mannitol; the acetate, ethoxylated and propoxylated derivatives of glycerine, polyethylene glycol, ethylene glycol, propylene glycol, sorbitol, mannitol; and mixtures thereof, said plasticizer is present in an amount of about 20 to 60 wt. % of the destructurized starch component of step (a);

c. optionally blending the product of step (b) with up to about 20% urea with respect to the weight of the destructurized starch component of step (a);

d. blending the product of step (c) with about 15 to 55 wt. % of unmodified starch; and a water soluble plasticizer containing hydroxyl groups and having a molecular weight of less than about 1000.

12. A shaped article formed from the composition of claim 1.

13. A shaped article formed from the composition of claim 11 which is a tampon applicator.

14. A composition of matter made by the process of combining:

a. about 15 to 50 wt. % of a starch-polymer alloy, the starch-polymer alloy comprising:

i. about 50 to 80 wt. % destructurized starch and about 20 to 50 wt. % of a hydrophobic copolymer selected from the group consisting of ethylene-vinyl acetate having a vinyl acetate molar content of from about 5 to 90%, modified ethylene vinyl-acetate having from about 5 to 90% of hydrolyzed acetate groups, ethylene-glycidil acrylate, ethylene-methyl methacrylate, ethylene-maleic anhydride, and mixtures thereof;

ii. a plasticizer present in an amount of about 20 to 60 wt. % of the destructurized starch component of (i) present in the starch-polymer alloy, said plasticizer is selected from the group consisting of glycerine; polyethylene glycol; ethylene glycol; propylene glycol; sorbitol; mannitol; the acetate, ethoxylated and propoxylated derivatives of glycerine, polyethylene glycol, ethylene glycol, propylene glycol, sorbitol, mannitol; and mixtures thereof; and iii. 0 up to about 20% urea with respect to the weight of the destructurized starch component of (i); and b. about 15 to 55 wt. % of unmodified starch; and c. a water soluble plasticizer containing hydroxyl groups and having a molecular weight of less than about 1000.

* * * * *